(12) United States Patent
Pelkonen

(10) Patent No.: US 9,005,792 B2
(45) Date of Patent: Apr. 14, 2015

(54) LOCKING MECHANISM

(75) Inventor: Arto Ilari Pelkonen, Tampere (FI)

(73) Assignee: Nokia Corporation, Espoo (FI)

( * ) Notice: Subject to any disclaimer, the term of this patent is extended or adjusted under 35 U.S.C. 154(b) by 732 days.

(21) Appl. No.: 12/741,165

(22) PCT Filed: Nov. 2, 2007

(86) PCT No.: PCT/FI2007/050591
§ 371 (c)(1),
(2), (4) Date: Aug. 4, 2010

(87) PCT Pub. No.: WO2009/056665
PCT Pub. Date: May 7, 2009

(65) Prior Publication Data
US 2011/0020685 A1 Jan. 27, 2011

(51) Int. Cl.
*H01M 2/10* (2006.01)
*H01M 2/00* (2006.01)
*E05B 15/04* (2006.01)
*E05B 15/10* (2006.01)
*E05B 15/12* (2006.01)
*H05K 7/00* (2006.01)
*H04M 1/02* (2006.01)

(52) U.S. Cl.
CPC .................................. *H04M 1/0262* (2013.01)

(58) Field of Classification Search
None
See application file for complete search history.

(56) References Cited

U.S. PATENT DOCUMENTS

| 2003/0001395 A1* | 1/2003 | Barthelet et al. | 292/175 |
| 2003/0085686 A1 | 5/2003 | Haga et al. | |
| 2006/0082977 A1* | 4/2006 | Kim | 361/727 |
| 2007/0026888 A1* | 2/2007 | Zhou | 455/550.1 |
| 2009/0268401 A1* | 10/2009 | Krah | 361/679.55 |

OTHER PUBLICATIONS

International Search Report and Written Opinion of the International Searching Authority for PCT Application No. PCT/FI2007/050591, dated Jul. 8, 2008, 13 pages.

* cited by examiner

*Primary Examiner* — Patrick Ryan
*Assistant Examiner* — Angela Martin
(74) *Attorney, Agent, or Firm* — Harrington & Smith

(57) ABSTRACT

The invention relates to a locking system for locking a lid of a portable electronic device, comprising at least a latch, a detent and a first return member. The latch has at least a first position of the latch and a second position of the latch, wherein the latch is connected to the lid in the first position of the latch, and the latch is disconnected from the lid in the second position of the latch. The detent has at least a first position of the detent and a second position of the detent, and the detent is adjusted to detain the latch in the second position of the latch. The first return member is adjusted to move the latch from the second position of the latch to the first position of the latch.

15 Claims, 5 Drawing Sheets

LOCKING MECHANISM

RELATED APPLICATION

This application was originally filed as PCT Application No. PCT/FI2007/050591 on Nov. 2, 2007 and is incorporated herein by reference in its entirety.

FIELD OF THE INVENTION

The present invention relates generally to locking devices and more particularly to a locking mechanism for a lid of a mobile electronic device, such as a mobile phone, a personal computer, a hand-held computer, a hand-held media device, or a game machine.

BACKGROUND OF THE INVENTION

Battery latches for portable electronic devices are well known in the art. However, prior art battery latches usually have poor usability.

Many prior art latching devices also incorporate springs for biasing a latch mechanism into a closed position. One problem with these types of preloaded latching devices is that the user must at same time use the latching devices and open the battery door. Often two hands are needed for opening the door, and therefore the device is laid down, for example on the table. This kind of operation is difficult or embarrassing in a mobile life style, where the use of a device should be possible even when the user changes position.

Furthermore, most prior art latching devices are usually cumbersome and bulky. Therefore, they seldom find application in the down-sized, low profile electronic devices being marketed today.

Therefore, a new latching design is needed for latching a lid of mobile device which latching design is easy to use in order to overcome the above-mentioned problems.

SUMMARY OF THE INVENTION

It is, therefore, an object of the present invention to provide a new locking system for locking a lid of a portable electronic device that is easy to use.

It is another object of the present invention to provide a device with a locking system for locking a lid of a device, which locking system is easy to use.

The foregoing objects are accomplished by a locking system for locking a lid of a portable electronic device, comprising at least a latch, a detent and a first return member. The latch has at least a first position of the latch and a second position of the latch, wherein the latch is connected to the lid in the first position of the latch, and the latch is disconnected from the lid in the second position of the latch. The detent has at least a first position of the detent and a second position of the detent, and the detent is adjusted to detain the latch in the second position of the latch. The first return member is adjusted to move the latch from the second position of the latch to the first position of the latch.

In one embodiment the system comprises a second return member, which is adjusted to move the detent from the first position of the detent to the second position of the detent. In one embodiment the detent and the second return member are integrated in a same structure.

In one embodiment the return member is a spring.

In one embodiment the detent and the first return member are integrated in a same module.

In one embodiment the detent is adjusted to push the lid outwards when the latch is removed from the first position of the latch to the second position of the latch.

In one embodiment the lid comprises a lug, to which the latch is connected in the first position of the latch.

Different embodiments and solutions of the locking system offer many different advantages. In one solution the parts of the locking system are easy and cheap to manufacture. In another solution the mechanism of the locking system is robust. In addition, in one solution the closed lid is spring-loaded, so it cannot make noise (for example rattle). It is also possible to produce a down-sized locking system.

DESCRIPTION OF THE DRAWINGS

The objects and features of the present invention will become more apparent from the consideration of the following detailed description taken in conjunction with the accompanying drawings, in which.

DETAILED DESCRIPTION OF THE INVENTION

Figure 1:
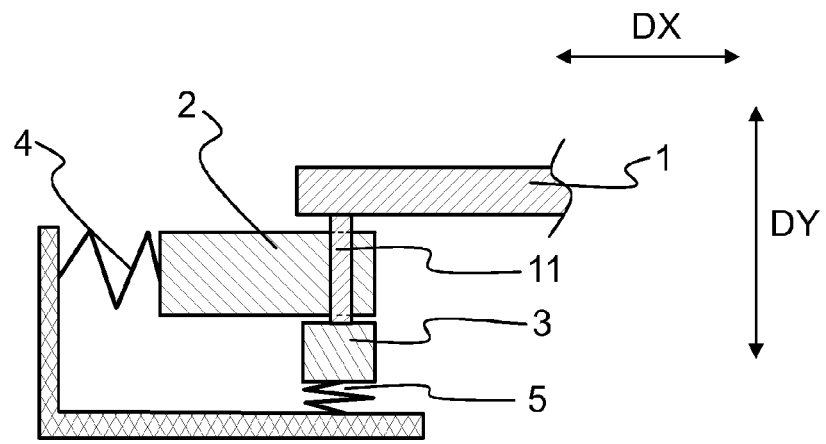
FIG. 1 illustrates an embodiment of a locking system when it is locked
Figure 2:
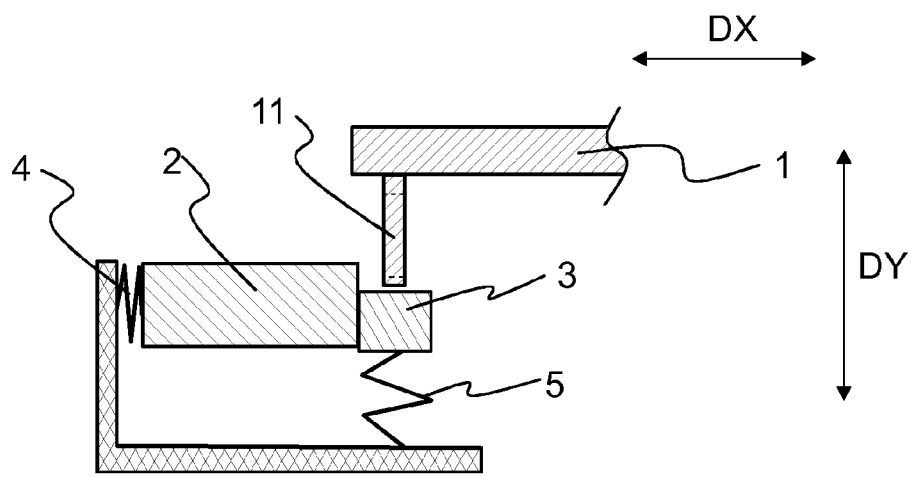
FIG. 2 illustrates the embodiment of FIG. 1 when it is opened

FIG. 1 illustrates a locking system for locking a lid of a portable electronic device in a locking position and FIG. 2 illustrates the system in an open position. The portable electronic device can be, for example, a mobile phone, a personal computer, a hand-held computer, a hand-held media device, or a game machine. The lid, in turn, can be, for example, a battery door, a lid of memory card room, or some other kind of a lid.

In principle the locking system of a lid 1 comprises a latch 2 and a detent 3. The lid 1 has an opening direction DY. The latch 2 is adjusted mobile in direction DX, which is substantially perpendicular to the opening direction DY of the lid 1. The detent 3 is adjusted mobile in direction DY. The latch 2 has at least a first position and a second position. The latch 2 is connected to the lid 1 in the first position and the latch is disconnected from the lid in the second position. In addition, the latch 2 is adjusted to detain the detent 3 in the first position. The detent 3, in turn, is adjusted to detain the latch 2 in the second position.

Preferably the latch 2 is connected to a first return member 4. The first return member 4 is advantageously adjusted to return the latch 2 to the first position. In addition, the detent 3 is connected to a second return member 5. The second return member 5 is advantageously adjusted to return the detent 3 to the second position of the detent.

Figure 3:
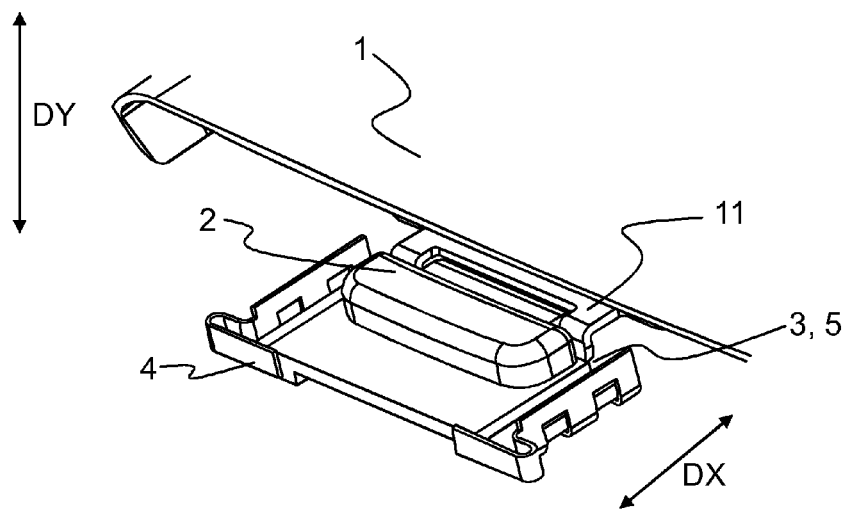
FIG. 3 illustrates another embodiment of a locking system when it is locked
Figure 4:
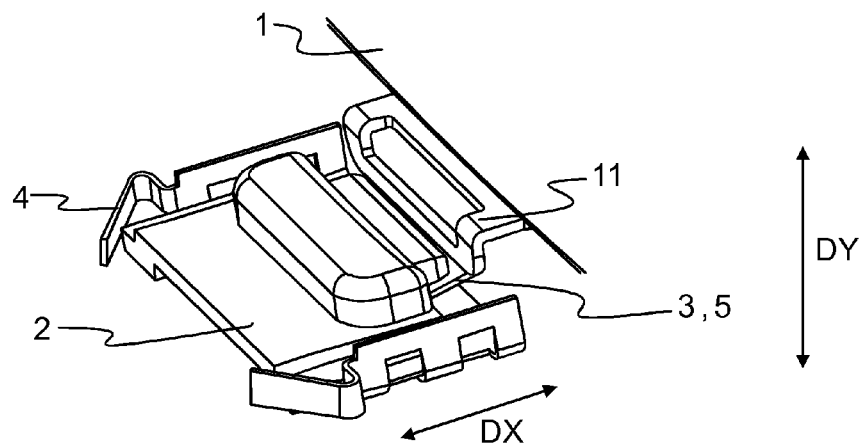
FIG. 4 illustrates the embodiment of FIG. 3 when it is opened

The locking system according to FIGS. 3 and 4 comprises at least a latch 2, a detent 3 and a first return member 4. The latch 2 has at least a first position and a second position. FIG. 3 illustrates the situation when the latch 2 is in the first position of the latch. FIG. 4 illustrates the situation when the latch 2 is in the second position of the latch. The latch 2 is connected to the lid 1 in the first position and the latch is disconnected from the lid in the second position. In addition, the latch 2 is adjusted to detain the detent 3 in the first position, as shown in FIG. 3. The detent 3, in turn, is adjusted to detain the latch 2 in the second position, as shown in FIG. 4.

The first return member 4 is adjusted to move the latch 2 from the second position to the first position. In this example the first return member 4 is a spring (formed of some kind of spring leafs). Naturally the spring could be some other kind of a spring, for example, a coil spring. The first return member 4 could also be formed of elastic material. An elastic structure returns to its original shape when a load is removed. The main idea of the return member 4 is that it returns to the first position when a load and/or a detent 3 is removed.

In this example the detent 3 is integrated to the second return member 5 and, therefore, reference numbers 3 and 5 point to the same place in the figures. The combination is a spring (formed of some kind of a spring leaf). Of course the spring could be some other kind of a spring, for example, a coil spring. The detent 3 could also be formed of elastic material. The main idea of the detent 3 and the second return member 4 is that it returns in the second position of the detent when a load (the latch 2 and the lid 1) is removed.

In addition, in this example the detent 3, the first return member 4 and the second return member 5 are integrated in the same module. The first return member 4 and the second return member 5 comprise spring leafs that are formed in the frame of the locking device.

Figure 5:
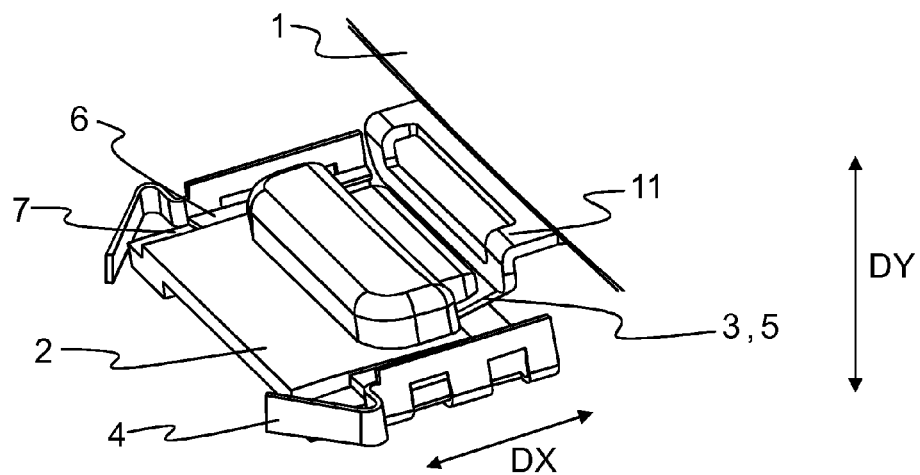
FIG. 5 illustrates an embodiment of a locking system with guide rails

In one embodiment the locking structure comprises one or more guide rails 6 for guiding the latch 2, as shown in FIG. 5. The guide rails 6 keep the latch 2 on the right path when the latch moves. In addition, in a preferred embodiment the guide rails 6 keep the latch 2 in the right position during the movement and when the latch is not moving. The guide rails 6 prevent the latch 2 from moving sideways or getting stuck. The guide rails 6 can be formed in many ways. In one solution the guide rails 6 are in the same module with the first return member 4 and the counterparts 7 (for example, sliders) are advantageously formed in the latch 2. In another embodiment the guide rails 6 are formed in the latch 2 and there are counterparts 7 in the surrounding structure. For example, the sliders 7 could be in the same module with the first return member 4.

Figure 6:
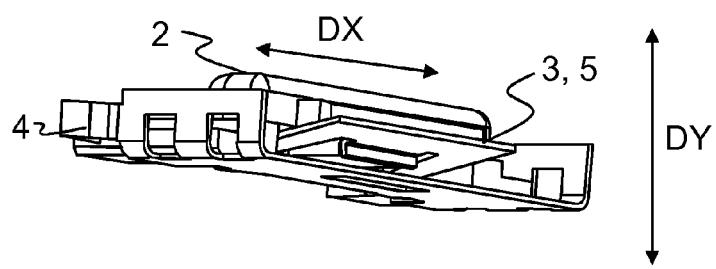
FIG. 6 illustrates the embodiment according to FIG. 3 from another angle of view

As can be seen from FIG. 6, the locking structure can be formed very thin. This is possible because in this embodiment the latch 2 and the first return member 4 are substantially on the same level and the combination of the detent 3 and the second return member 5 is very thin.

Figure 7:
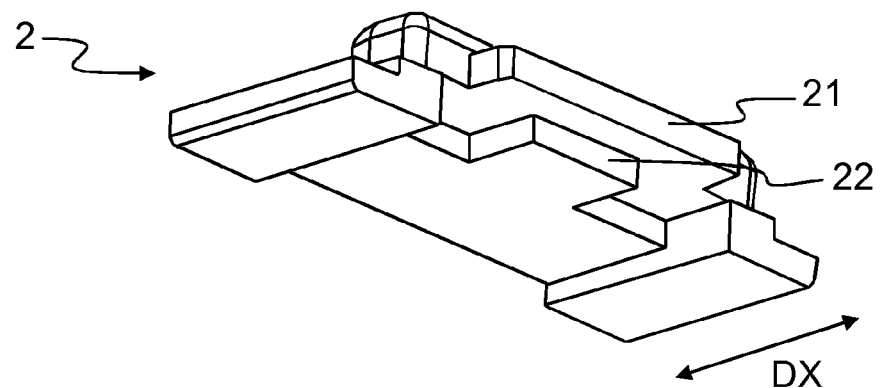
FIG. 7 illustrates an embodiment of a latch
Figure 8:
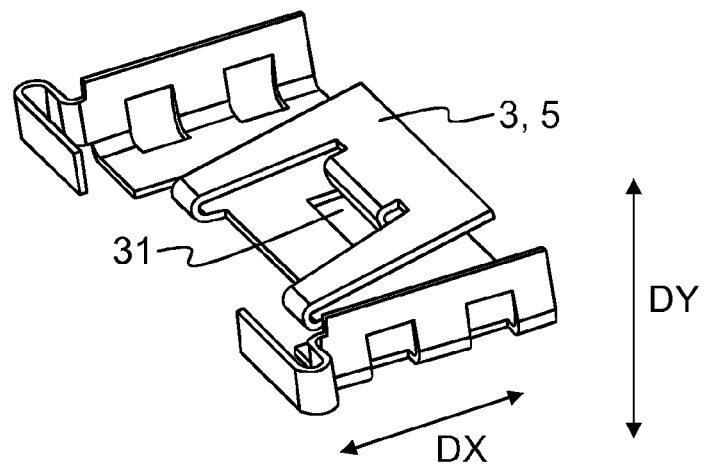
FIG. 8 illustrates an embodiment of a detent

The latch 2 can be formed in many ways. FIG. 7 illustrates a preferred solution where the latch 2 comprises at least a protruding locking part 21 and a protruding clutch part 22. The locking part 21 of the latch 2 is for locking the lid 1 of the device. The locking part 21 is connected to the lid 1 in the first position. The clutch part 22 of the latch 2 is used to hold the latch in the detent 3, when the latch is in the second position. In the embodiment shown in FIG. 8, the detent 3 comprises a hole 31 which is able to hold the clutch part 22.

The lid 1 may comprise a structure, to which the latch 2 can be connected. In the example according to FIG. 4, the lid 1 comprises a lug 11, to which the latch 2 is connected in the first position. The lug 11 comprises a hole, to which the latch 2 is able to be connected. In the example the lug 11 is adjusted to remove the detent 3 from the hold position (second position of the detent) when the lid 1 is closed.

Advantageously the detent 3 is adjusted to push the lid 1 outwards when the latch 2 is moved from the first position to the second position. This function is very advantageous in use, because the lid 1 opens at least a little bit when the locking system is turned to open position and the user can easily recognize that the manoeuvre really has succeeded.

Figure 9:
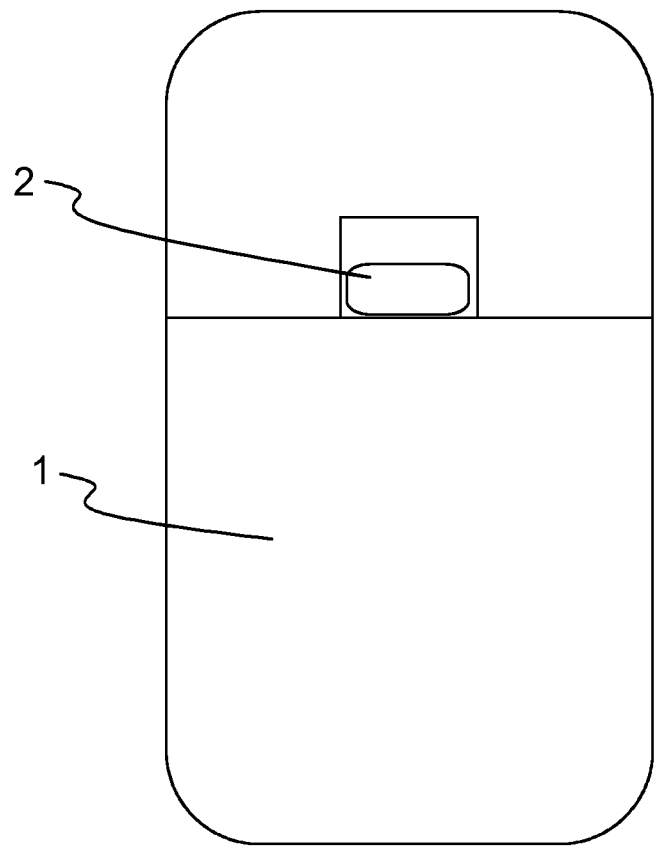
FIG. 9 illustrates an embodiment of a device For the sake of clarity, the figures only show the details necessary for understanding the invention. The structures and details that are not necessary for understanding the invention but are obvious for anyone skilled in the art have been omitted from the figures in order to emphasize the characteristics of the invention.

FIG. 9 illustrates a portable electronic device comprising a locking system for locking a lid 1 of the device. The device is shown from the direction where the lid is. The lid 1 can be, for example, a battery door, a lid of memory card room, or some other kind of a lid. The portable electronic device can be, for example, a mobile phone, a personal computer, a hand-held computer, a hand-held media device, or a game machine.

Next the operation of the locking system will be explained.

When the user wants to open the lid 1, he or she pulls the latch 2 away from the lid (in this solution where the locking system is located in the device). When the latch 2 moves from the first position to the second position, the detent 3 "pops up" (the detent 3 moves from the first position of the detent to the second position of the detent, i.e. hold position). The detent 3 detains the latch 2 in the second position in such a manner that the latch cannot return to the first position. At the same time the detent 3 pushes the lid 1 up, so it is very easy to open the lid 1.

When the user wants to close the lid 1, he or she puts the lid 1 back and pushes the lid. The lid 1 pushes the detent 3 and the detent moves from the second position of the detent (hold position) to the first position of the detent. When the detent 3 moves, the latch 2 "pops" in the first position of the latch. The latch 2 connects to the lid 1. Thus, the lid 1 is locked.

In this embodiment the detent 3 has two functions when opening the lid 1 of the device. Firstly it detents the latch 2 in the second position. Secondly the detent 3 pushes the lid 1 up in the opening phase.

In addition, in a preferred embodiment the detent element 3 has a special function when the lid 1 is closed. The detent 3 forms a spring-load against the lid 1, which load eliminates clearance between the lid and the locking system. Therefore, the detent 3 advantageously prevents the rattle of the closed lid 1.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. An apparatus, comprising:
 a locking system for locking a lid of an electronic device, the locking system comprising:
 a latch positionable in one of a first latch position and a second latch position, the latch being connected to the lid in the first latch position and disconnected from the lid in the second latch position;
 a detent positionable in at least a first detent position and a second detent position, the detent being configured to detain the latch in the second latch position; and
 a first return member configured to move the latch from the second latch position to the first latch position, wherein the first return member is a spring;

wherein the latch is adjusted to detain the detent in the first latch position and the detent is adjusted to detain the latch in the second latch position.

2. An apparatus according to claim 1, wherein the locking system comprises a second return member configured to move the detent from the first detent position to the second detent position.

3. An apparatus according to claim 2, wherein the detent and the second return member are integrated in a structure.

4. An apparatus according to claim 1, wherein the detent and the first return member are integrated in a module.

5. An apparatus according to claim 1, wherein the locking system further comprises a guide rail for guiding the latch.

6. An apparatus according to claim 1, wherein the detent is configured to push the lid outwards when the latch is moved from the first latch position to the second latch position.

7. An apparatus according to claim 1, wherein the lid comprises a lug configured to couple the latch in the first latch position.

8. An electronic device, comprising:
   a locking system for locking a lid of the electronic device, the locking system comprising:
   a latch positionable in one of a first latch position and a second latch position, the latch being connected to the lid in the first latch position and disconnected from the lid in the second latch position;
   a detent positionable in one of a first detent position and a second detent position; and
   a first return member configured to move the latch from the second latch position to the first latch position, wherein the first return member is a spring;
   wherein the latch is configured to detain the detent when the latch is in the first latch position and the detent is configured to detain the latch when the detent is in the second detent position.

9. A device according to claim 8, wherein the locking system further comprises a second return member configured to move the detent from the first detent position to the second detent position.

10. A device according to claim 8, wherein the detent and the first return member are integrated in a module.

11. A device according to claim 8, wherein the locking system of the device further comprises a guide rail for guiding the latch.

12. A device according to claim 8, wherein the detent is configured to push the lid outwards when the latch is moved from the first latch position to the second latch position.

13. A device according to claim 8, wherein the lid comprises a lug configured to couple the latch in the first latch position.

14. A device according to claim 8, wherein the device is at least one of a mobile phone, a personal computer, a hand-held computer, a hand-held media device and a game machine.

15. A device according to claim 8, wherein the lid is a battery door of the device.

* * * * *